Dec. 26, 1922.
R. SHOEMAKER.
ICE CREEPER.
FILED DEC. 23, 1921.
1,440,182
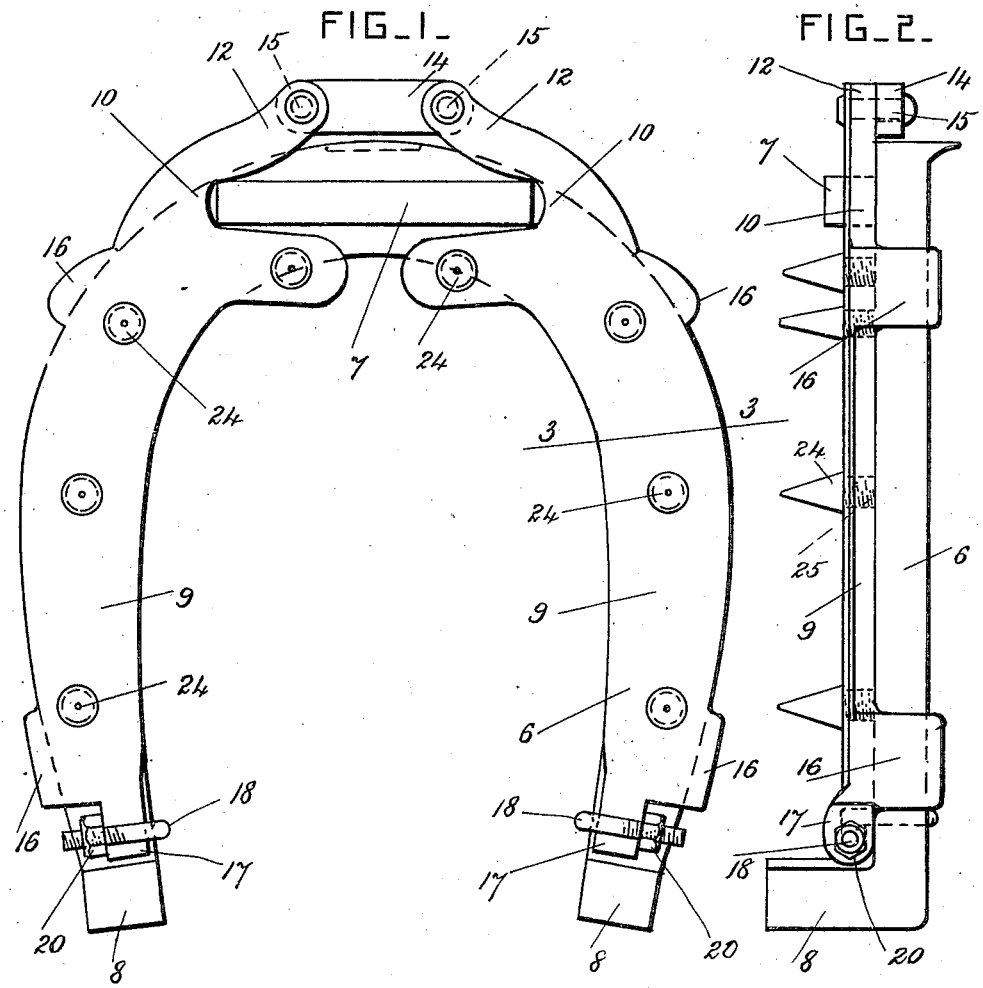
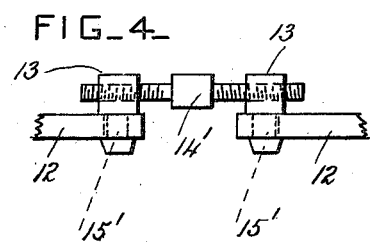
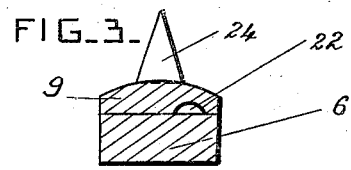
Inventor
Royal Shoemaker
by Hubert H. Jenner
Attorney Patented Dec. 26, 1922.

1,440,182

UNITED STATES PATENT OFFICE.

ROYAL SHOEMAKER, OF BOURNEVILLE, OHIO.

ICE CREEPER.

Application filed December 23, 1921. Serial No. 524,450.

*To all whom it may concern:*

Be it known that I, ROYAL SHOEMAKER, a citizen of the United States, residing at Bourneville, in the county of Ross and State of Ohio, have invented certain new and useful Improvements in Ice Creepers, of which the following is a specification.

This invention relates to ice creepers specially adapted for attachment to horseshoes provided with toe calks and heel calks; and it consists in the novel construction and combination of the parts hereinafter fully described and claimed.

In the drawings, Figure 1 is a plan view of an ice creeper constructed according to this invention, showing it applied to a horseshoe, Fig. 2 is a side view of the same, Fig. 3 is a cross-section, taken on the line 3—3 in Fig. 1, and Fig. 4 is a side view showing an adjustable link connection.

The horseshoe 6 is of any approved make and size, and it is provided with the usual toe calk 7 and heel calks 8. The ice creeper is formed of two curved bars 9, each of which is arranged under one-half of the horseshoe, and is curved to correspond with the curvature of the horseshoe. Each bar 9 has a forked front end portion or jaw 10 which straddles one end of the toe calk 7. The forked portions 10 are wedge-shaped so that they slip easily over the calk, and their narrow ends engage with the ends of the calk, and prevent the bars 9 from being displaced longitudinally. The outer members 12 of the parts 10 are secured together pivotally by a link 14 and pins 15.

The outer sides of the bars 9 are provided with hook-shaped lugs 16 which engage with the outer side edges of the horseshoe. The rear ends of the bars 9 have eyes 17 which are of about one-half the width of the bars in thickness, the eyes being offset towards the inner sides of the bars, and arranged closely behind the heel calks 8 of the horseshoe.

Hook bolts 18 are provided, and their screwthreaded stems are passed through the eyes 17 from the inner sides of the bars 9, and their nuts 20 are screwed against the outer ends of the eyes 17. The hook bolts hook over the rear end portion of the horseshoe, and their nuts are screwed up by a specially constructed wrench. The bars 9 are provided with grooves 22 in their upper sides so as to clear the heads of the nails which secure the shoe to the hoof of the animal. The bars 9 are preferably convex on their under sides, so that they are thickest at the middle, and spikes or calks 24 are screwed into screwthreaded holes 25 formed in the middle parts of the bars 9 where thickest, and in the rear members of the forked jaws 10.

The ice creepers are removed and replaced on the horseshoes as often as necessary, without removing the shoes from the hoofs, and they are very effective in preventing the animals from slipping.

The link 14 may be replaced by an adjustable link connection, as shown in Fig. 4, in which the pins 15' are formed on lugs 13, which are connected by a bolt 14' having right and left screwthreads on its end portions which engage with holes in the lugs.

What I claim is:

1. An ice creeper for a horseshoe, comprising two curved bars provided with spikes and having forked front end portions adapted to straddle and engage with the ends of the toe calk of the horseshoe, said bars having also eyes at their rear ends, a link pivotally connecting together the front members of the said forked end portions, and hook bolts engaging with the said eyes and adapted to secure the said bars to the horseshoe.

2. An ice creeper for a horseshoe, comprising two curved bars having convex under sides, said bars having forked front end portions adapted to engage with the toe calk of the horseshoe, said bars having also lugs on their sides for engaging with the sides of the horseshoe, spikes secured in holes in the thickest parts of the said bars, means for pivotally connecting together the forked front end portions of the said bars, and clamping devices for securing the rear end portions of the said bars to the horseshoe.

In testimony whereof I have affixed my signature.

ROYAL SHOEMAKER.